(12) United States Patent
Meschkat et al.

(10) Patent No.: US 9,141,596 B2
(45) Date of Patent: Sep. 22, 2015

(54) SYSTEM AND METHOD FOR PROCESSING MARKUP LANGUAGE TEMPLATES FROM PARTIAL INPUT DATA

(75) Inventors: Steffen Meschkat, Zurich (CH); Stefan Haustein, Zurich (DE)

(73) Assignee: Google Inc., Mountain View, CA (US)

( * ) Notice: Subject to any disclaimer, the term of this patent is extended or adjusted under 35 U.S.C. 154(b) by 647 days.

(21) Appl. No.: 13/461,866

(22) Filed: May 2, 2012

(65) Prior Publication Data

US 2015/0178258 A1  Jun. 25, 2015

(51) Int. Cl.
*G06F 17/00* (2006.01)
*G06F 17/24* (2006.01)
*G06F 17/22* (2006.01)

(52) U.S. Cl.
CPC .......... *G06F 17/241* (2013.01); *G06F 17/2247* (2013.01)

(58) Field of Classification Search
CPC ....... G06F 17/248; G06F 3/0481; G06F 8/38; G06F 9/4445
USPC ....................................................... 715/234
See application file for complete search history.

(56) References Cited

U.S. PATENT DOCUMENTS

| | | | |
|---|---|---|---|
| 6,792,607 B1 * | 9/2004 | Burd et al. .................. 719/316 |
| 7,428,699 B1 * | 9/2008 | Kane et al. .................. 715/236 |
| 7,685,609 B1 * | 3/2010 | McLellan .................... 719/328 |
| 8,602,793 B1 * | 12/2013 | Sniedzins .................... 434/322 |
| 8,799,770 B2 * | 8/2014 | Morris et al. ................ 715/234 |
| 9,021,348 B1 * | 4/2015 | Meschkat et al. ........... 715/235 |
| 9,026,903 B1 * | 5/2015 | Michael et al. ............. 715/235 |
| 2002/0032701 A1 * | 3/2002 | Gao et al. .................... 707/513 |
| 2002/0035580 A1 * | 3/2002 | Tanabe ........................ 707/513 |
| 2003/0009563 A1 | 1/2003 | Douglis et al. |
| 2003/0037303 A1 * | 2/2003 | Bodlaender et al. ........ 715/523 |
| 2003/0084078 A1 * | 5/2003 | Torii et al. ................... 707/513 |
| 2004/0044965 A1 * | 3/2004 | Toyama et al. .............. 715/523 |
| 2004/0268238 A1 * | 12/2004 | Liu et al. ..................... 715/513 |
| 2005/0039119 A1 * | 2/2005 | Parks et al. .................. 715/515 |
| 2006/0031751 A1 * | 2/2006 | Ehud ......................... 715/501.1 |
| 2006/0173863 A1 * | 8/2006 | Paulus et al. ................ 707/100 |
| 2008/0028302 A1 * | 1/2008 | Meschkat .................... 715/255 |
| 2008/0098291 A1 * | 4/2008 | Bradley et al. .............. 715/223 |
| 2010/0306738 A1 | 12/2010 | Verma et al. |

* cited by examiner

*Primary Examiner* — Kyle Stork
*Assistant Examiner* — Mario M Velez-Lopez
(74) *Attorney, Agent, or Firm* — Dority & Manning, P.A.

(57) ABSTRACT

Template processing techniques to generate documents, such as HTML documents, in situations where the template depends on input data that are available in different locations are provided. A template can include a plurality of template-processing instructions which can specify how to bind input data from a data structure to the template. The input data can be declared as template parameters in the template. According to aspects of the present disclosure, the template can include an annotation associated with one or more of the template parameters. The annotation can be indicative of the availability of input data at the server or at a client device.

17 Claims, 4 Drawing Sheets

SYSTEM AND METHOD FOR PROCESSING MARKUP LANGUAGE TEMPLATES FROM PARTIAL INPUT DATA

FIELD

The present disclosure relates generally to document processing and more particularly, to techniques for template processing using partial input data to generate web documents, such as Hypertext Markup Language (HTML) documents.

BACKGROUND

In typical web applications, data are presented to a user by formatting the data as HTML documents using template processing. In template processing, a document, such as a web page, can be generated using structured input data and a template. The structured input data contain the data to be presented in the document and the template specifies the layout of the document and how to bind the input data to the document. In certain web applications, template processing either happens at a server with the generated HTML document being sent to a client device (e.g. a web browser). Alternatively, the template processing happens at a client device where the template and the input data are sent to the client device separately and the template processing is executed at the client device.

Developments in template processing have allowed for template processing at both the server and the client device and for dynamic shifting between template processing at the server and at the client device. For instance, a first version of the input data can be processed at the server to generate an HTML document that is sent to the client device. The generated HTML document can also serve as a template available for processing at the client device. As new input data become available at the client device, the client device can process the HTML document (which also acts as a template) to generate an updated HTML document.

In certain cases, a template can be dependent on multiple different input data that are not available in the same location. For example, some of the input data can be available only at the server. Other input data can be available only at the client device. Other input data can be available at both the server and the client device. The input data available at the client device can have a different data structure type than input data available at the server.

Techniques for processing templates that that are dependent on input data available in different locations include processing separate templates at the server and at the browser. Alternatively, the same template can be processed at the server and the browser, but the same input data needs to be supplied at both locations. Data that is not available, such as data available only on a client device, can be replaced by dummy data during template processing at the server. The template with the dummy data can then be sent to client device for reprocessing based on input data that become available at the client device.

SUMMARY

Aspects and advantages of the invention will be set forth in part in the following description, or may be obvious from the description, or may be learned through practice of the invention.

One exemplary embodiment of the present disclosure is directed to a computer-implemented method for processing a template. The method includes receiving a first template at a first computing device (e.g. a server). The first template can include a plurality of layout instructions that specify a layout of input data in a document to be generated from the first template. The first template can further include a plurality of template-processing instructions. The template-processing instructions specify how to bind input to the document. The plurality of template-processing instructions can include a first template-processing instruction dependent on a first template parameter associated with input data available at the first computing device and a second template-processing instruction dependent on a second template parameter associated with input data available at a second computing device (e.g. a client device).

According to aspects of the present disclosure, the first template can further include an annotation associated with at least one of the first template parameter and the second template parameter. The method can include processing the first template at the first computing device based on input data available at the first computing device to generate a second template. The second template can include the second template-processing instruction. The second template-processing instruction can be embedded in the second template such that the second template is both a template and a valid document for display at the second computing device.

Other exemplary implementations of the present disclosure are directed to systems, apparatus, computer-readable media, devices, and user interfaces for processing a template to generate a document, such as an HTML document.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved template processing techniques to generate documents, such as HTML documents, in situations where the template depends on input data that are available in different locations. The template can include a plurality of template-processing instructions which can specify how to bind input data from a data structure to the template. The input data can be declared as template parameters in the template. Certain of the template parameters can be associated with input data available only at a server. Other template parameters can be associated with input data available only at a client device. Yet other template parameters can be associated with input data available at both the server and the client device.

According to aspects of the present disclosure, the template can include an annotation associated with one or more of the template parameters. The annotation can be indicative of the availability of input data at the server or at a client device. In one example, the annotation can be a serveronly annotation which indicates that the input data associated with a template parameter is available only at the server. In another example, the annotation can be a browseronly annotation which indicates that the input data associated with a template parameter is available only at a client device. In yet other examples, the annotation can specify a data structure type of the input data associated with the template parameter.

When the template is processed at the server, only those template-processing instructions that are dependent on template parameters associated with input data available at the server are evaluated. The template-processing instructions that are dependent on template parameters associated with input data available only at a client device are left in the template. These template-processing instructions can be embedded in the template such that the template acts as both a template and a valid document, such as an HTML document, for display at the client device. The template can be reprocessed at the client device to bind the input data available at the client device to the template.

The template processing techniques according to aspects of the present disclosure can provide for improved template processing. In particular, the template can be partially processed at the server based on partial input data, such as input data available at the server, to generate a document that serves as both a template and valid document for display at the client device. The template parameters dependent on input data available at the client device are not evaluated, but are included in the template provided to the client device. More particularly, certain template parameters associated with input data available only at the client device are not replaced with dummy data before sending the template to the client device. Rather, template parameters associated with input data available only at the client device can be first processed when the template is received at the client device, leading to more efficient binding of input data to the template.

Figure 1:
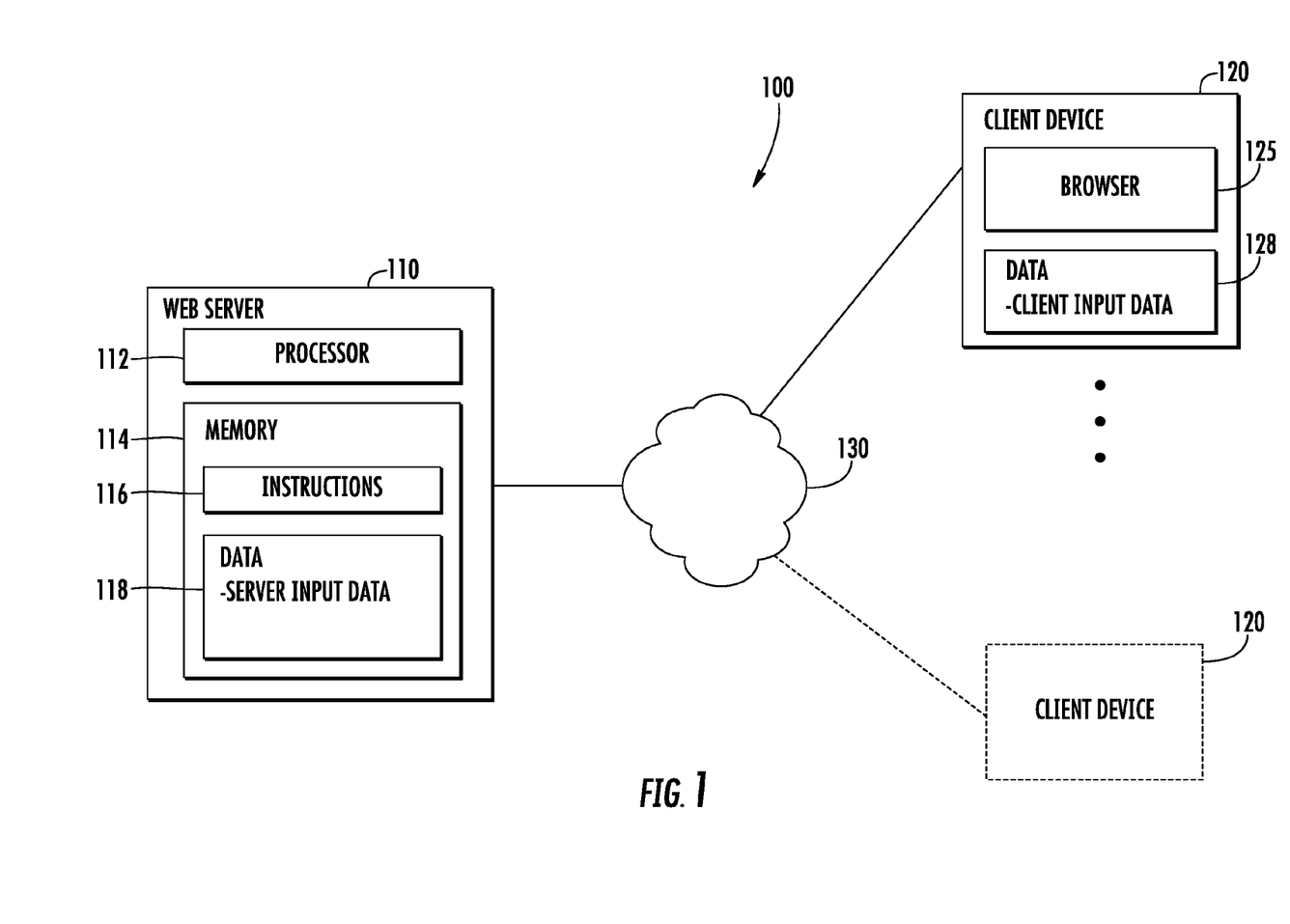
FIG. 1 depicts an exemplary computing system according to an exemplary embodiment of the present disclosure.

FIG. 1 depicts an exemplary computing environment 100 according to an exemplary embodiment of the present disclosure. The computing environment 100 can include any number of computing systems that include one or more computing devices having any suitable computational ability. Computing environment 100 includes a server 110 and one or more client devices 120 connected over a network 130. One of client devices 120 is illustrated in dashed line to indicate that any number of client devices 120 can be connected to server 110 over network 130.

While FIG. 1 illustrates one example of a computing environment 100 that can be used to implement the methods of the present disclosure, those of ordinary skill in the art, using the disclosures provided herein, will recognize that the inherent flexibility of computer-based systems allows for a great variety of possible configurations, combinations, and divisions of tasks and functionality between and among the components. For instance, the computer-implemented methods discussed herein may be implemented using a single server or processor or multiple such elements working in combination. Databases and other memory/media elements and applications may be implemented on a single system or distributed across multiple systems.

Network 130 can include any number of wired or wireless communication links for coupling together computing devices. For instance, network 130 can include one or more of a cellular network, WiFi network, LAN, WAN, the Internet, and/or other suitable network. Server 110 can include a network interface to allow communications with the client devices 120 over network 130. Similarly, client device 120 can include a network interface to allow communication with the server 110 over the network 130. The server 110 and the client device 120 can exchange information over the network 130 in any suitable format. For instance, the information can include HTML messages or other suitable format.

Server 110 can include any computing device configured to exchange information with the client device 120. In one embodiment, the server 110 can be a web server that can host web pages, web sites, web applications, and/or other server-client applications. Server 110 can include a processor(s) 112 and a memory 114. The processor(s) 112 can be any known processing device, such as a microprocessor, digital signal processor, controller, or other suitable processing device. Memory 114 can include any suitable computer-readable medium or media, including, but not limited to volatile memory, non-volatile memory, RAM, ROM, hard drives, flash drives, magnetic and optical storage devices, or other memory devices.

Memory 114 can store information accessible by processor(s) 112, including computer-readable instructions 116 that can be executed by processor(s) 112. The instructions 116 can be any set of instructions that when executed by processor(s) 112 cause the processor(s) 112 to provide desired functionality, such as any of the template processing techniques disclosed herein. The instructions 116 can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 114 can store data 118 that can be accessed and/or manipulated by processor(s) 112. For instance, memory 114 can store server side input data that can be used to generate a document, such as an HTML document for presentation on a browser 125 of a client device 120. The data 118 can be stored in one or more databases. The databases can also be split up so they are in multiple locales. The databases data can be coupled to server 110 through a high bandwidth LAN or WAN or through network 130.

Client device 120 can generally include any node on the network 130 that includes computational ability and that can communicate with server 110. For instance, the client device 120 can be a personal computer, smartphone, desktop, laptop, smart device, PDA, tablet, or other computing device. The client device 120 can include a processor and a memory and can include appropriate input and output devices, such as a display screen, touch screen, touch pad, data entry keys, speakers, and/or microphone suitable for voice recognition. The client device 120 can be configured to display information to users through a suitable user interface.

Client device 120 can host a browser 125 which can be any application that can display web documents, such as a web browser. Browser 125 can allow a user to browse and interact with web pages, web sites, web-based applications, and other client-server applications. Client device 120 can also store, receive, generate or access data 128 that can be used by the client device 120. For instance, client device 120 can store, receive, generate, or access data that can be used to update or generate a web document, such as an HTML document, for presentation on the browser 125. According to aspects of the present disclosure, the server 110 and the client device 120 can be configured to perform template processing techniques to generate a web document for display on a browser 125 of the client device 120.

Figure 2:
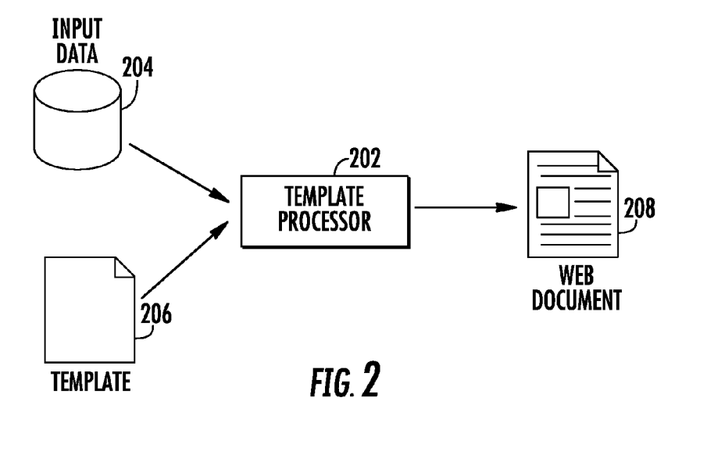
FIG. 2 depicts a diagram of template processing used to generate a web document.

FIG. 2 generally illustrates how template processing can be used to generate a web document, such as an HTML document. As shown, template processor 202 can receive input data 204 and a template 206. Template processor 202 can be configured to bind the input data 204 to the template 206 to generate a web document 208.

Input data 204 typically contains the data that needs to be presented in the web document 208. Input data 204 can be defined in a data structure and can include one or more types of data, such as simple data and/or one or more data objects. The data objects can be specified using a programming language (e.g. JavaScript). As will be discussed in detail below, input data 204 can be available only at server 110 (see FIG. 1) or can be available only at a client device 120. Alternatively, the input data 204 can be available at both the server 110 and the client device 120.

Referring to FIG. 2, template 206 typically contains layout instructions that specify how to layout the data in the web document 208. For instance, the layout instructions can specify fonts, colors, paragraph layout, tables, lists, sections, image locations, image sizes, etc. within the web document 208. The layout instructions can be in any suitable format, such as HTML format.

The template 206 can further include template-processing instructions that tell the template processor 202 how to bind input data 204 to the template 206. The template-processing instructions can include one or more template parameters that refer to elements stored in input data 202. During processing of the template, the template processor 202 can evaluate the template parameter to generate a string or object in the web document 208. The template-processing instructions can involve simple variable substitution or can be relatively complex. In general, template-processing instructions can be as powerful as general purpose programming instructions.

Figure 3:
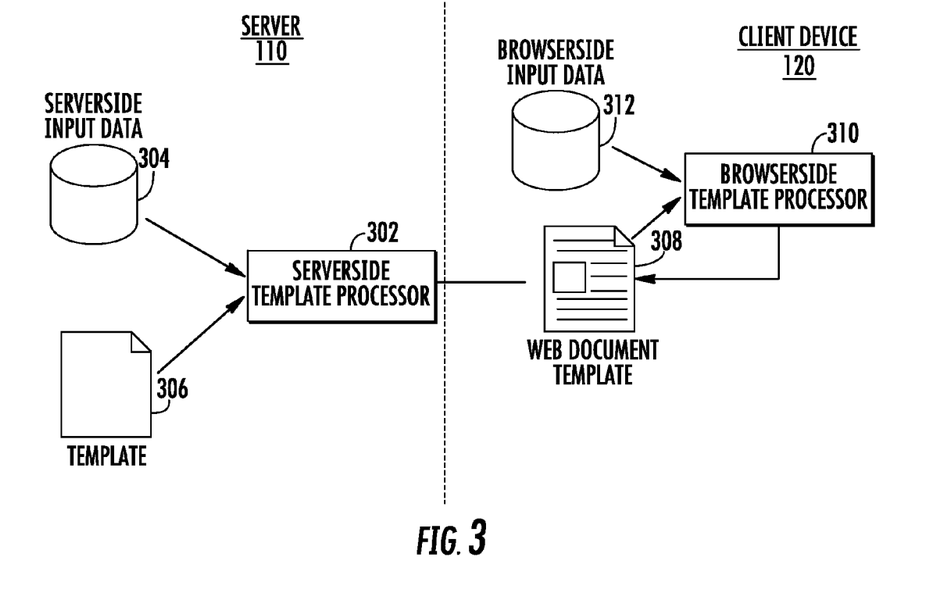
FIG. 3 depicts a diagram of template processing used to generate a web document according to an exemplary embodiment of the present disclosure.

FIG. 3 illustrates how template processing can occur at both a server 110 and a client device 120 according to exemplary aspects of the present disclosure. In particular, a serverside template processor 302 receives serverside input data 304 and a first template 306. As will be discussed below, the first template can include a plurality of template-processing instructions that specify how to bind the serverside input data 304 to the template 306. Certain of the template-processing instructions can depend on template parameters associated with serverside input data 304. In addition, certain of the template-processing instructions can depend on template parameters associated with browserside input data 312.

Serverside template processor 302 processes the first template 306 to generate a second template 308 from the input data 304 and the first template 306. The second template 308 can be provided to the client device 120 over a network via a network interface. The second template 308 can be both a template and a valid web document for display at the client device 120. In particular, the web document/template 308 can include a plurality of template-processing instructions that were not evaluated at the server 110. Rather, the template-processing instructions are provided as part of the web document/template 308 to specify binding instructions for browserside input data 312 to the web document/template 308. A browserside template processor 310 can receive or access the browserside input data 312 and update or modify the web document/template 308 with browserside input data 312 pursuant to the template-processing instructions provided as part of the web document/template 308. In one embodiment, the template-processing instructions are provided as custom HTML attributes in the web document 208 so that the template-processing instructions do not interfere with the display of the web document/template 308 at the client device 120.

To facilitate template processing based on input data available at different locations, such as serverside input data 304 and browserside input data 312, the first template 306 can include annotations associated with template parameters that are indicative of the availability of input data for the template parameters. As an example, the first template 306 can include a first annotation type, such as a serveronly annotation, that indicates that input data associated with a template parameter is available only at the server. Additionally or in the alternative, the first template 306 can include a second annotation type, such as a browseronly annotation, that indicates that input data associated with a template parameter is available only at the client device.

The serverside template processor 302 can identify which template-processing instructions to evaluate based at least in part on the annotations in the first template 306. For instance, the serverside template processor 302 can identify template parameters that depend on input data 304 available at the server based on the annotations. The serverside template processor 302 can evaluate the template parameters that depend on serverside input data 304. The remaining template-processing instructions remain as part of the second template/web document 308 for processing by the browserside template processor 310.

Figure 4:
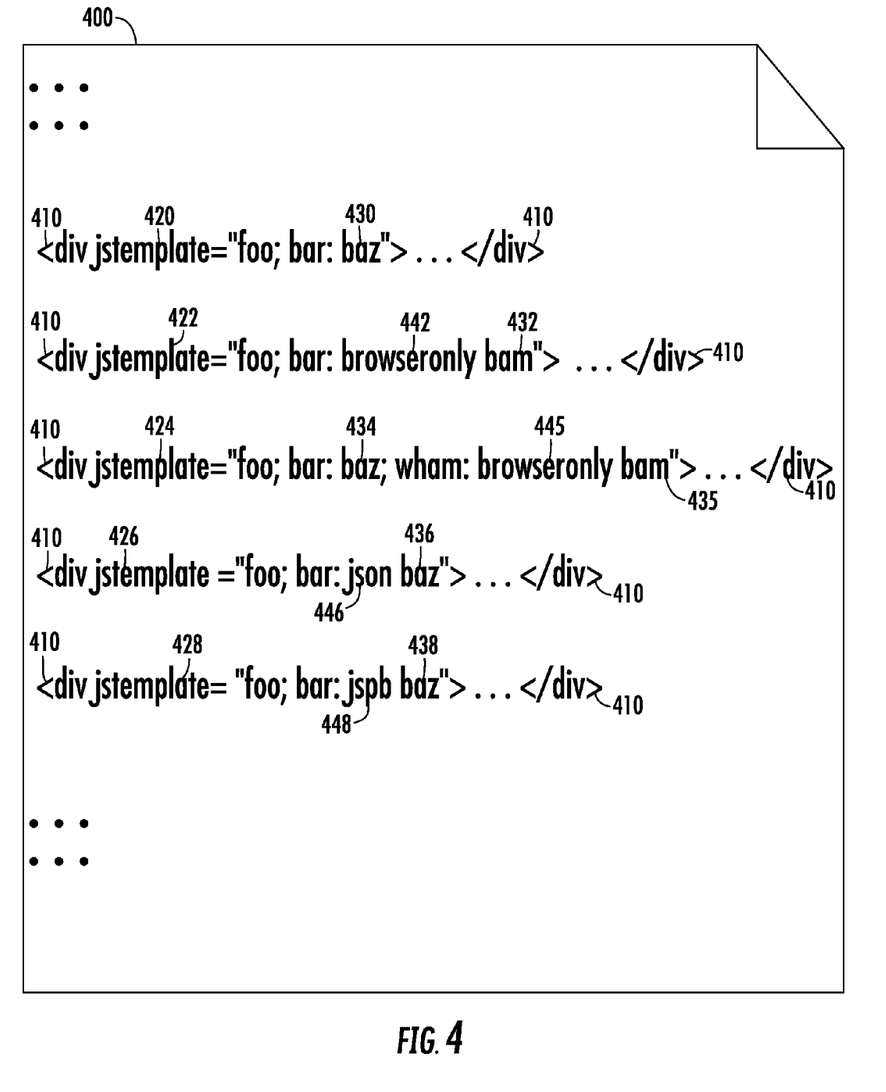
FIG. 4 depicts an exemplary template according to an exemplary embodiment of the present disclosure.

FIG. 4 depicts an exemplary template 400 according to an exemplary embodiment of the present disclosure. The template 400 is illustrated with reference to example instructions and attributes for exemplary and illustration purposes. Those of ordinary skill in the art, using the disclosures provided herein, should understand that template 400 can include any number of instructions and attributes of varying complexity without deviating from the scope of the present disclosure.

As illustrated, template 400 includes a plurality of layout instructions 410 that specify the layout of an HTML document. In particular, template 400 includes exemplary HTML tags <div> and </div> that divide the HTML document into different sections. Template 400 also includes a plurality of template processing-instructions 420, 422, 424, 426, and 428, such as the "jstemplate" processing instruction. This exemplary "jstemplate" processing instruction can be used to bind input data from a specified field in a data structure to the template 400.

Each of the template-processing instructions 420, 422, 424, 426, and 428 is dependent on a template parameter 430, 432, 434, 435, 436 and 438. As will be discussed in more detail below, the template parameters 430, 432, 434, 435, 436 and 438 can be associated with input data available at different locations. Certain of the input data can be available at the server. Certain of the input data can be available at the client device. Other input data can be available at both locations.

To identify the availability of the input data, the template 400 further includes annotations 442, 445, 446 and 448 that are indicative of the availability of the input data either at the server or at the client device. The annotations can also specify a data structure type of the input data. For instance, annotations 446 and 448 specify a data structure type of the input data. During processing of the template 400, a template processor can identify which template-processing instructions to evaluate at a given location (e.g. server or client device) based on the annotations.

For example, template 400 includes a first processing instruction 420 that is dependent on a first template parameter 430. The first template parameter 430 is associated with an element in an input data structure. No annotation is associated with the first template parameter 430 in template 400. The default rule for template parameters with no annotation can be that the template parameter is associated with input data available only at the server. Accordingly, the first template parameter 430 can be determined to be associated with input data available at the server. Alternatively, an annotation such as "serveronly" (not shown) can be associated with the first template parameter 430 to indicate that the input data associated with the first template parameter 430 is available at the server. During template processing of the template 400 at the server, the first template parameter 430 will be evaluated based on the input data associated with the template parameter 430.

Template 400 also includes a second template-processing instruction 422 that is dependent on a second template parameter 432. A "browseronly" annotation 442 is associated with the second template parameter 432. The "browseronly" annotation indicates that the second template parameter 432 should not be evaluated at the server. Rather, the second template parameter 432 should be sent to the client device for evaluation. As shown, the second template-processing instruction 422 can be embedded in the template 400 as a custom HTML attribute. As a result, the second template-processing instruction 422 does not interfere with the display of template 400 as a web document at the client device.

According to particular aspects of the present disclosure, template 400 can also include a third template-processing instruction 424. Template-processing instruction 424 is dependent on two template parameters 434 and 435. The template parameter 434 has no associated annotation indicating that it is dependent on input data available at the server. The template parameter 435 has a browseronly annotation 445 indicating that it is dependent on input data available at the client device. During template processing of the template 400 at the server, the template parameter 434 will be evaluated and replaced with a literal value. The template parameter 434 will not be evaluated at the server. The template-processing instruction 424 can be sent to the client device for further processing, such as evaluation of template parameter 435 based on browserside input data.

According to aspects of the present disclosure, the template 400 can also include annotations that specify a data structure type, such as a javascript data structure type, of the input data at the client device. Exemplary data type annotations can include a "json" annotation or a "jspb" annotation. In one embodiment, the annotation can indicate that the input data is available at the client device in a particular data structure type. During processing of the template 400 at the server, the template-processing instruction associated with the data type annotation can be modified to accommodate the data structure type available at the server. The modified template-processing instruction can be evaluated at the client device based on the input data available at the client device.

Alternatively, the data type annotations can indicate that the input data is available in a first data structure type at the server, such as a protocol buffer data structure type, and that the input data is also available in a second data structure type at the client device, such as a javascript data structure type. The template parameters associated with these annotations can be evaluated a first time at the server based on the first data structure type and a second time at the client device based on the second data structure type. The template-processing instruction can be modified during template processing at the server to accommodate the second data structure type available at the client device.

For example, template 400 includes a template-processing instruction 426 that is dependent on a template parameter 436. A "json" annotation 446 is associated with the template parameter 436. The "json" annotation indicates that template parameter 436 can be evaluated at the client device as a JSON (JavaScript Object Notation) object. In this example, template parameter 436 can be passed to the client device unchanged.

Template 400 also includes a template-processing instruction 428 that is dependent on a template parameter 438. A "jspb" annotation 448 is associated with the template parameter 438. The "jspb" annotation indicates that the template parameter 438 can be evaluated at the client device as a JSPB Array. The template-processing instruction 428 can be modified during template processing at the server to accommodate the JSPB Array data type. In particular, the template parameter 438 can be modified from object property access expressions (e.g. "foo.wham") to array element access expressions (e.g. "foo[1]").

In a particular implementation, a template parameter can be associated with both a "browseronly" annotation and a data type annotation, such as a "json" annotation or a "jspb" annotation. In this embodiment, the template parameters are not evaluated at the server, but can be modified to accompany a data structure type, such as a JSPB data structure type, for evaluation at the client device. In another particular implementation, a template parameter can refer to a submessage of the original template parameter. In this case, the submessages can be structured to inherent the annotation associated with any parent template parameter.

Figure 5:
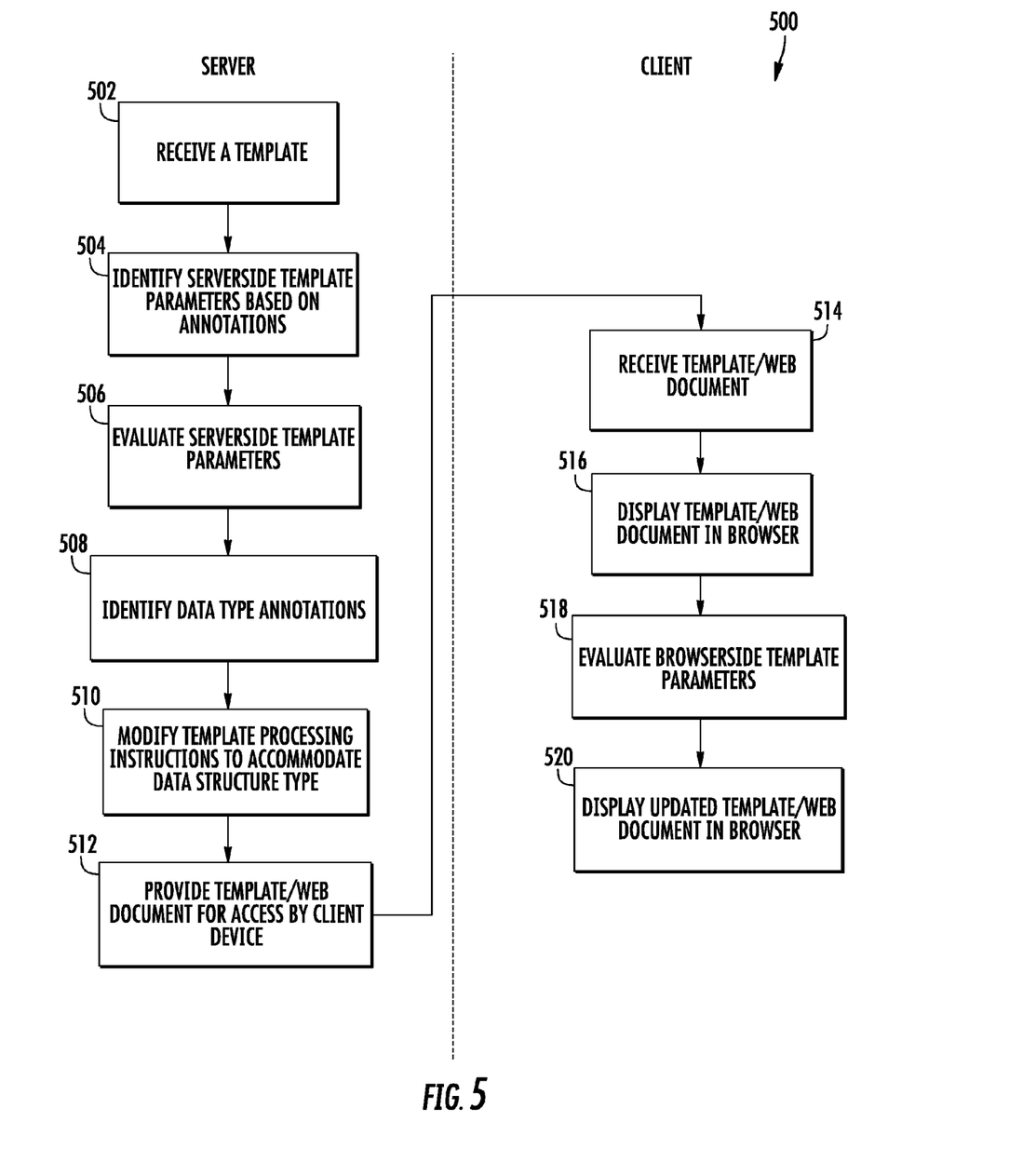
FIG. 5 depicts a server-client flow diagram of an exemplary method according to an exemplary embodiment of the present disclosure.

FIG. 5 depicts an exemplary server-client flow diagram of an exemplary method (500) according to an exemplary embodiment of the present disclosure. The exemplary method (500) can be implemented using any suitable computing environment, such as the computing environment 100 depicted in FIG. 1. In addition, although FIG. 5 depicts steps performed in a particular order for purposes of illustration and discussion, the methods discussed herein are not limited to any particular order or arrangement.

At (502), a template is received at the server. As discussed above with reference to FIG. 4, the template can include a plurality of layout instructions and a plurality of template-processing instructions. Certain of the template-processing instructions can be dependent on template parameters associated with input data available at the server. Certain of the template-processing instructions can be dependent on template parameters associated with input data available at the client device. The template can also include one or more annotations associated with the template parameters to indicate the availability of the input data at the server or at the client device. Certain of the annotations can also be indicative of a data structure type associated with the input data.

Referring to FIG. 5, the template can be processed at the server by a template processing routing executed by the server. In particular, the server can process the template by identifying template parameters associated with serverside input data based on the annotations (504) and evaluating the template parameters based on the serverside input data (506). For instance, on one example the processor can identify template parameters associated with a "serveronly" annotation and evaluate the template parameters based on the serverside input data. In another example, all template parameters that do not include an annotation can be determined to be associated with input data available at the server. The server can identify template parameters not associated with an annotation and evaluate the template parameters based on the serverside input data.

The server can further process the template by identifying any data type annotations (508), such as "json" annotations and/or "jspb" annotations, and modifying any template-processing instructions dependent on template parameters associated with the data type annotations (510). For instance, the processor can modify element access expressions associated with the template-processing instructions from field access by name to field access by id where appropriate.

At (512), the server can provide the processed template for access by the client device. The processed template can include any template-processing instructions that were not evaluated at the server. For instance, the processed template can include template-processing instructions dependent on template parameters having an annotation indicating that the template parameter is associated with input data available only at the client device. The template-processing instructions can be embedded in the template such that the template acts as both a template and a valid web document, such as an HTML document, for display at the client device.

At (514), the client device receives the template/web document from the server and displays the template/web document in a browser (516). The template/web document can then be processed at the client device by a template processing routine executed by the client device. In particular, the template can evaluate the remaining template parameters dependent on input data available at the client device (518) and display the updated template/web document in the browser (520).

The web document can be further updated at the client device based on user actions. For instance, an event handler configured to handle updates to web content based on user input. The event handler can include instructions written in a scripting language (e.g. JavaScript) that generates an object whenever a user performs an action. The event handler can update the input data available at the client device based on the user actions The updated input data can then be bound to the web document pursuant to template processing instructions embedded in the web document.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for processing a template, the method comprising:

receiving a first template at a first computing device, the first template comprising:

a plurality of layout instructions specifying a layout of input data in a document to be generated from the first template,         a plurality of template-processing instructions, the template-processing instructions specifying how to bind input data to the document, the plurality of template-processing instructions comprising a first template-processing instruction dependent on a first template parameter associated with input data available only at the first computing device and a second template-processing instruction dependent on a second template parameter associated with input data available only at a second computing device, and         an annotation associated with the second template parameter, the annotation indicative of the availability of input data only at the second computing device;

identifying the second template-processing instruction for evaluation at the second computing device based at least in part on the annotation;

processing the first template at the first computing device based on input data available at the first computing device to generate a second template, wherein processing the first template at the first computing device comprises embedding, at the first computing device, the second template-processing instruction in the second template such that the second template is both a template and a valid document for display at the second computing device, wherein the second template-processing instruction is not evaluated at the first computing device.

2. The computer-implemented method of claim 1, wherein the annotation specifies a data structure type of the input data.

3. The computer-implemented method of claim 2, wherein the data structure type is a javascript data structure.

4. The computer-implemented method of claim 2, wherein the method further comprises modifying the second template-processing instruction to accommodate the data structure type specified in the annotation.

5. The computer-implemented method of claim 1, wherein processing the first template at the first computing device comprises:

identifying the first template-processing instruction based on an annotation associated with the first template parameter; and     binding input data to the first template parameter pursuant to the first template-processing instruction.

6. The computer-implemented method of claim 1, wherein the first template-processing instruction comprises a third template parameter, the third template parameter associated with input data available at the second computing device.

7. The computer-implemented method of claim 6, wherein processing the first template at the first computing device comprises:

binding input data to the first template parameter pursuant to the first template-processing instruction to replace the first template parameter with at least one literal value; and embedding the first template-processing instruction having the at least one literal value and the third template parameter in the second template, the first template-processing instruction embedded in the second template such that second template is both a template and a valid document for display at the second computing device.

8. The computer-implemented method of claim 1, wherein the document is a web page, the first template is an HTML (HyperText Markup Language) document, the second template is an HTML document, and the second template-processing instruction is embedded within HTML attributes of the second template.

9. A computing device comprising a processor, a memory, and a network interface, the processor configured to execute computer-readable instructions stored in the memory to cause the processor to perform the operations of:
   receiving a first template at the computing device, wherein the first template comprises:
      a plurality of layout instructions specifying a layout of input data in a document;
      a plurality of template-processing instructions, the template-processing instructions specifying how to bind input data to the document, the plurality of template-processing instructions comprising a first template-processing instruction dependent on a first template parameter associated with input data available only at the computing device and a second template-processing instruction dependent on a second template parameter associated with input data available only at a remote computing device; and
      an annotation associated with the second template parameter, the annotation indicative of the availability of input data only at the remote computing device;
   identifying the second template-processing instruction for evaluation at the remote computing device based at least in part on the annotation;
   processing the first template at the computing device based on input data available at the computing device to generate a second template, wherein processing the first template at the computing device comprises embedding, at the computing device, the second template-processing instruction in the second template such that second template is both a template and a valid document for display at the remote computing device, wherein the second template-processing instruction is not evaluated at the computing device; and
   providing the second template, via the network interface, for access by the remote computing device.

10. The computing device of claim 9, wherein the annotation specifies a data structure type of the input data.

11. The computing device of claim 10, wherein the processor is configured to execute computer-readable instructions stored in the memory to cause the processor to perform the operation of modifying the second template-processing instruction to accommodate the data structure type specified in the annotation.

12. The computing device of claim 9, wherein the processor is configured to perform the operation of processing the first template at the computing device by performing the operations of:
   identifying the first template-processing instruction based on an annotation associated with the first template parameter; and
   binding input data to the first template parameter pursuant to the first template-processing instruction.

13. The computing device of claim 9, wherein the first template-processing instruction comprises a third template parameter, the third template parameter associated with input data available at the remote computing device.

14. The computing device of claim 13, wherein the processor is configured to perform the operation of processing the first template at the computing device by performing the operations of:
   binding input data to the first template parameter pursuant to the first template-processing instruction to replace the first template parameter with at least one literal value; and
   embedding the first template-processing instruction having the at least one literal value and the third template parameter in the second template, the first template-processing instruction embedded in the second template such that second template is both a template and a valid document for display at the remote computing device.

15. A computer-implemented method for processing a template, the method comprising:
   receiving a client side template at a computing device via a network interface, the client side template comprising a client side template-processing instruction dependent on a client side template parameter associated with input data available only at the computing device, the client side template-processing instruction embedded in the client side template such that the client side template is both a template and a valid document for display at the computing device; and
   binding, at the computing device, input data available only at the computing device to the client side template parameter pursuant to the client side template-processing instruction embedded in the client side template;
   wherein the client side template is generated from a server side template, the server side template comprising the client side template-processing instruction and a server side template-processing instruction, the server side template-processing instruction dependent on a server side template parameter associated with input data available only at a remote computing device, the server side template further comprising an annotation associated with the client side template parameter, the annotation indicative of the availability of input data only at the computing device.

16. The computer-implemented method of claim 15, wherein the annotation specifies a data structure type of the input data available at the computing device.

17. The computer-implemented method of claim 15, wherein the client side template further comprises a template-processing instruction having a literal value and a client side template parameter associated with input data available at the computing device.

* * * * *